United States Patent
Gibson et al.

[11] Patent Number: 5,977,765
[45] Date of Patent: Nov. 2, 1999

[54] SPEED, DIRECTION, AND ACCELERATION SENSOR FOR A ROTATING SHAFT HAVING A ROTOR WITH TEETH HAVING UNEQUAL SPACING

[75] Inventors: Patrick William Gibson, Northville; Robert Cary Haase, Southfield; David Andrew Franchock, Livonia; Bradley Dean Riedle, Northville; Charles William Suter, South Lyon, all of Mich.

[73] Assignee: Ford Global Technologies, Inc., Dearborn, Mich.

[21] Appl. No.: 08/985,651

[22] Filed: Dec. 5, 1997

[51] Int. Cl.$^6$ .............................. G01P 3/52; G01P 13/00; G01B 7/15; G01B 7/30

[52] U.S. Cl. .............. 324/165; 324/207.25; 324/207.22; 341/6; 341/15; 340/672

[58] Field of Search ............................. 324/165, 207.22, 324/207.25, 173, 174, 175; 341/15, 6; 340/671, 672, 565, 566; 318/168

[56] References Cited

U.S. PATENT DOCUMENTS

| | | |
|---|---|---|
| 4,142,153 | 2/1979 | Smith . |
| 4,774,494 | 9/1988 | Extance et al. .............................. 341/6 |
| 5,264,789 | 11/1993 | Braun et al. . |
| 5,371,460 | 12/1994 | Coffman et al. . |
| 5,523,679 | 6/1996 | Kalb . |

OTHER PUBLICATIONS

Sales brochure "Custome Variable Reluctance Sensors", American Electronic Components, Inc., Elkhart, IN.

Primary Examiner—Walter E. Snow
Attorney, Agent, or Firm—James J. Dottavio

[57] ABSTRACT

An apparatus is provided to determine the speed and direction of a rotating shaft, including a rotor with three circumferentially spaced teeth connected to the shaft. The spacing of the center of the second rotor tooth is wider than the spacing of the center of the first tooth and the spacing of the center of the third tooth is wider than the spacing of the center of the second tooth. A sensor detects the center of each tooth and produces a signal in response thereto. The signal is received by a computer. The computer determines the speed and direction of rotation of the shaft by determining a first time period to reach the center of the first tooth, a second time period to reach the center of the second tooth and a third time period to reach the center of the third tooth.

20 Claims, 3 Drawing Sheets

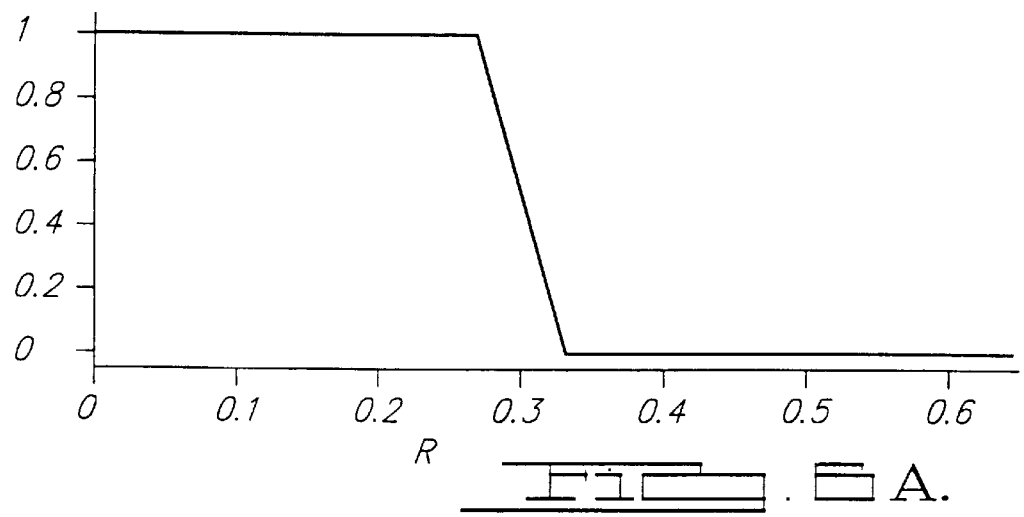
FIG. A.
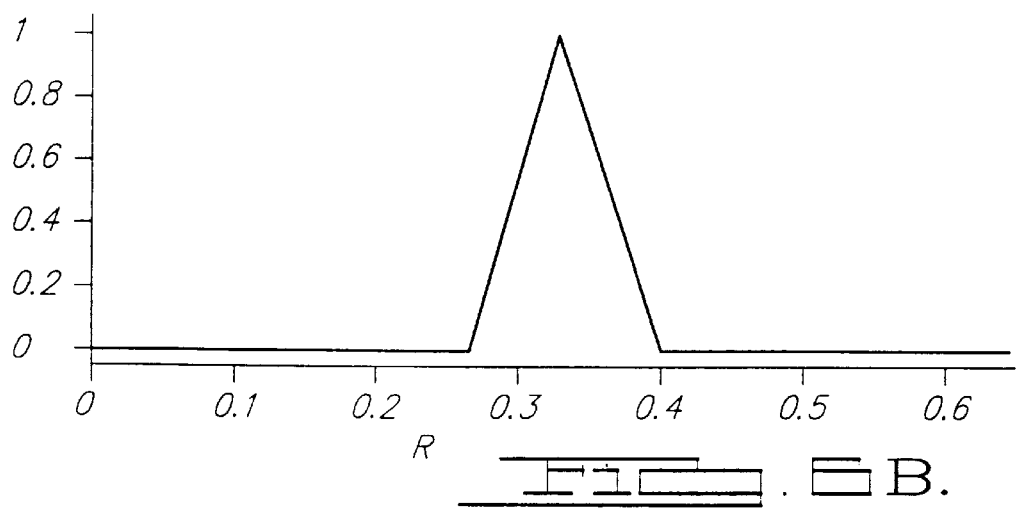
FIG. B.
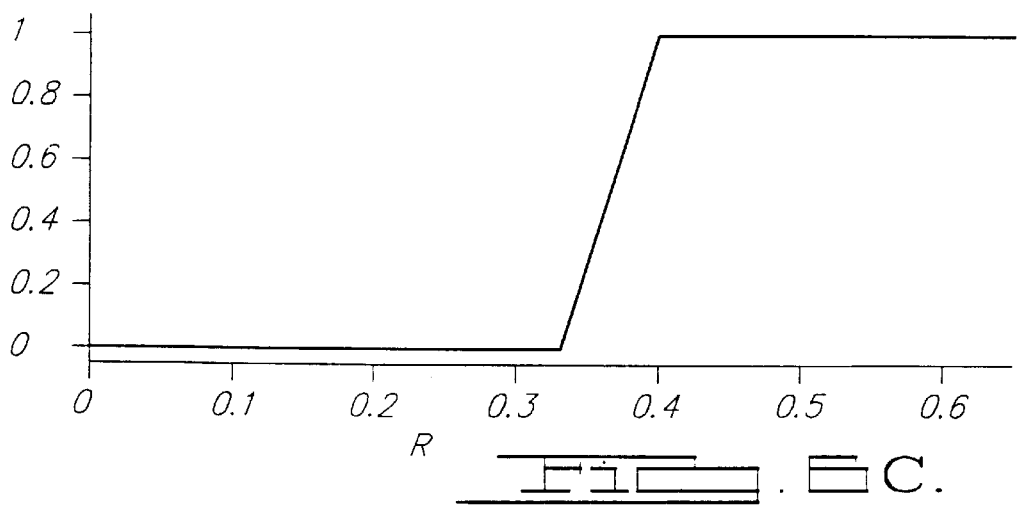
FIG. C.

SPEED, DIRECTION, AND ACCELERATION SENSOR FOR A ROTATING SHAFT HAVING A ROTOR WITH TEETH HAVING UNEQUAL SPACING

BACKGROUND OF THE INVENTION

1. Field of the Invention

This invention relates generally to an apparatus for determining the speed and direction of a rotating shaft, and more particularly an apparatus using a rotor having teeth or gaps with unequal spacing.

2. Discussion of the Prior Art

Electronic controllers are provided on modern vehicles to monitor the operation of the vehicle and provide information to the engine, transmission and other systems to control the functions thereof. One parameter which is monitored in several systems of the vehicles is the speed of rotating components. Some rotating components are provided in the transmission, driveline, and wheels.

Most prior art systems detect the speed of these components, but often do not provide directional information. In such systems, a sensor detects the rotation of a rotating component. Typically, a rotor is provided with a plurality of evenly spaced teeth, fixed to a rotating shaft. The rotor rotates with the shaft and a pickup sensor is placed in a position adjacent the rotor to sense the teeth as the rotor moves beneath the sensor. A controller is provided to receive a signal from the sensor. By counting the teeth and measuring time, the controller may calculate the speed of the shaft.

Additional sensors are required in most prior art systems to determine the direction of rotation of the component. In such a system, two sensors are placed in a particular spatial relationship with the teeth of the rotor. The sensors determine relative times at which an edge is detected. Thereafter, the controller may determine the direction of rotation. The additional sensor adds cost to the system and reduces reliability.

Another apparatus for measuring direction of rotation provides a feature, such as an oversized tooth, or, alternatively, deletes a tooth on the rotor. Such a system is disclosed in U.S. Pat. No. 4,972,332, issued Nov. 20, 1992, to Luebbering et al ('332 patent). The apparatus in the '332 patent includes a rotor with such a feature. The '332 patent includes one undersized tooth surrounded by a standard size tooth, and two consecutive under sized teeth separated from the first undersized tooth by three standard sized teeth. The apparatus detects both the rising and falling edges of the teeth to determine speed and direction of the rotor. The direction of the rotor is determined by identifying the single undersized tooth.

When the apparatus of the '332 patent detects three standard sized teeth followed by two undersized teeth, a first direction is established. If the above sequence is not detected, the controller determines the shaft is rotating in the opposite direction. The apparatus of the '332 patent thus requires several teeth to rotate past the sensor before the rotational direction may be determined, and thus a relatively long time must pass before the direction is determined. Furthermore, because the method used in the '332 patent detects the edge of the teeth, a Hall Effect sensor must be used to accurately detect the edges of the tooth. A Hall Effect sensor is an active sensor, including an integrated circuit requiring a voltage input, and is a relatively complicated sensor. A Hall Effect sensor may have occasional reliability problems and is sensitive to temperature variation in its operating environment.

U.S. Pat. No. 5,371,460, issued Dec. 6, 1994, to Coffman et al, describes another system for measuring the speed and direction of rotation of a shaft. A rotor is provided in the '460 patent with pairs of teeth having different widths. The teeth of various width are spaced circumferentially about the rotor. As with the '332 patent, the '460 patent measures the edges of the teeth and determines the width of the tooth after detecting each edge of the tooth. The apparatus of the '460 patent then establishes the sequence of the teeth and determines in which direction the shaft is rotating. As with the '332 patent, the '460 patent requires a Hall Effect sensor to detect the edge of the teeth, as described above. Furthermore, because the teeth are provided in pairs, the gaps between the teeth must also differ, otherwise the method taught in the '460 patent would be not functional, as an alternating wide and narrow tooth would be observed whether the shaft were rotating clockwise or counterclockwise.

It would be desirable to provide an apparatus for measuring the speed and direction of a rotating shaft using a simple sensor. It would also be desirable to provide such an apparatus having compensation for acceleration.

SUMMARY OF THE INVENTION

It is thus a general object of the present invention to provide an apparatus for measuring the speed and direction of a rotating shaft using a simple sensor and providing compensation for acceleration.

In carrying out the above object and other objects, features, and advantages of the present invention, a method and apparatus are provided to determine the speed and direction of a rotating shaft. A rotor is connected to the shaft. The rotor has three circumferentially spaced teeth. The distance between the center of the three teeth varies, the second center distance being greater than the first, the third being greater than the second.

A sensor detects the center of each tooth and produces a signal in response thereto, the signal being received by a computer. The computer determines the speed and direction of rotation of the shaft by determining a first time period to reach the center of the first tooth, a second time period to reach the center of the second tooth, and a third time period to reach the center of the third tooth.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 6 is an example of a Fuzzy Logic Mapping strategy for the present invention.

DETAILED DESCRIPTION OF THE PREFERRED EMBODIMENT

Figure 1:
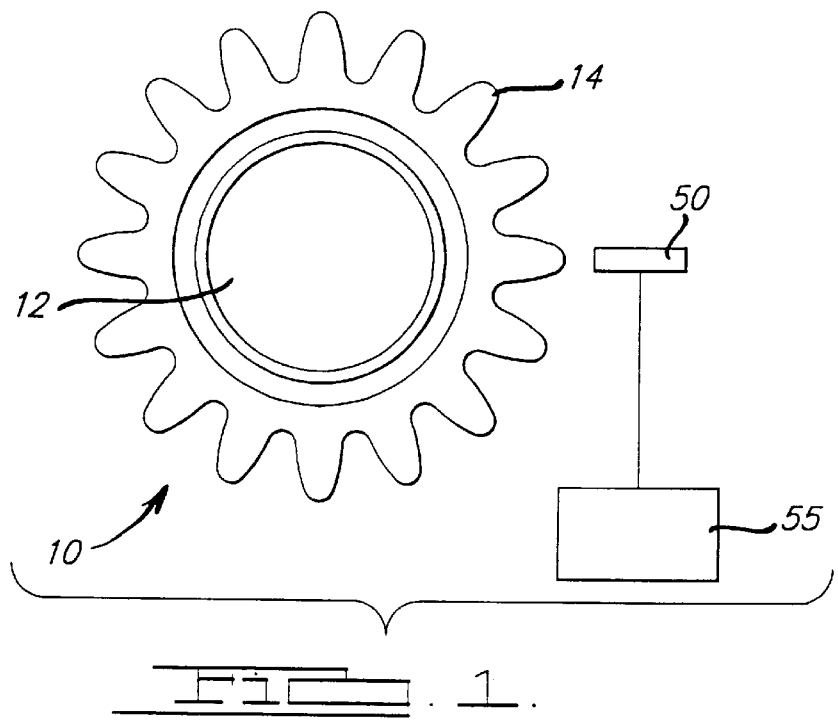
FIG. 1 is a block diagram of a system to detect the speed and direction of a rotating shaft according to an embodiment of the present invention.

FIG. 1 illustrates an apparatus 10 for determining the speed and direction of a rotating shaft 12 according to the present invention. The apparatus 10 includes a rotor 14 attached to the shaft 12, such that the shaft 12 and the rotor 14 rotate together. In a preferred embodiment, the rotor 14 of the present invention is provided on a transmission shaft to detect the speed and direction of rotation thereof.

Figure 2:
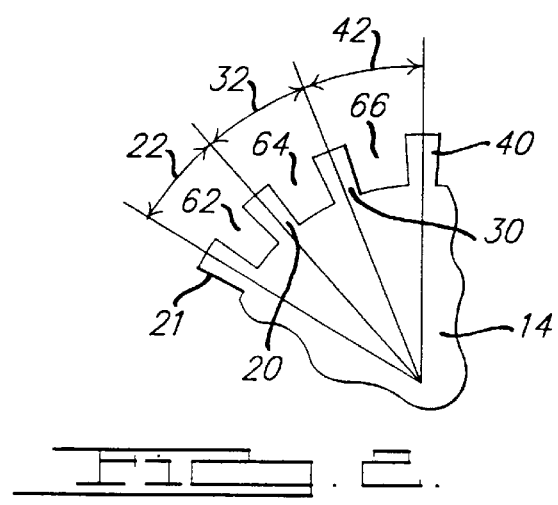
FIG. 2 is a representation of a portion of a rotor of FIG. 1 illustrating teeth having different tooth center widths according to a preferred embodiment.

As shown in FIG. 2, a portion of a preferred rotor 14 is shown, including a first tooth 20 having a first tooth center width 22 followed by a second tooth 30 having a second tooth center width 32 of greater proportion than the center width 22 of the first tooth 20. A third tooth 40 is provided following the second tooth 30. The third tooth 40 has a third tooth center width 42 of greater proportion than the center width 32 of the second tooth 30. This pattern of a narrow tooth center 20 medium width tooth center 30 and wide tooth center 40 is repeated about the circumference of the rotor 14. The number of the teeth is determined by the size of the shaft 12 and rotor 14 and the resolution desired for determining the speed and direction. One skilled in the art recognizes one set of three teeth could be provided and the three tooth center differences established therefrom, but in a preferred embodiment, several sets are provided to increase the frequency of the measurements.

In a preferred embodiment, as illustrated in FIG. 2, each of the teeth 20, 30, 40 has the same width. The spacing, or gaps, 62, 64, 66, between the teeth 20, 30, 40, vary to establish the various center widths. As illustrated in FIG. 2, a fourth tooth 21 is provided for reference to establish a gap 62 between the center of the first tooth 20 and the center of a circumferentially spaced tooth 21 on the opposite side of the second tooth 30. If only three teeth were provided, the reference tooth 21 would comprise the third tooth 40. In a preferred embodiment, additional teeth are provided for resolution and improve the speed of the readings.

In the embodiment illustrated in FIG. 2, a rotor is provided with eight groups of three teeth 20, 30, 40. The tooth center widths 22, 32, 42 are separated by angles of 12, 15, and 18 degrees. The teeth 20, 30, 40, 21 have a width of 6 degrees. Thus, the first tooth 20 extends across an angle of zero to 6 degrees, the second tooth 30 extends across an angle of 12 to 18 degrees, and the third tooth 40 extends across an angle of 27 to 33 degrees. This pattern is repeated about the circumference of the rotor 14. The tooth centers are therefore at 3, 15, and 30 degrees, repeated about the circumference of the rotor 14. The center of the gaps, 62, 64, 66 are provided at 9, 22.5, and 39 degrees, repeated about the circumference of the rotor 14. Thus, the gap 62, 64, 66 centers are separated by 16.5, 15, and 13.5 degrees, and the gap 62, 64, 66 widths are 9, 9, and 12 degrees.

In an alternative embodiment, the individual tooth widths vary and the gaps, 62, 64, 66 have a constant width. Thus, the centers of the teeth may be provided in a similar proximal relationship using teeth 20, 30, 40 of non-constant widths.

Figure 3:
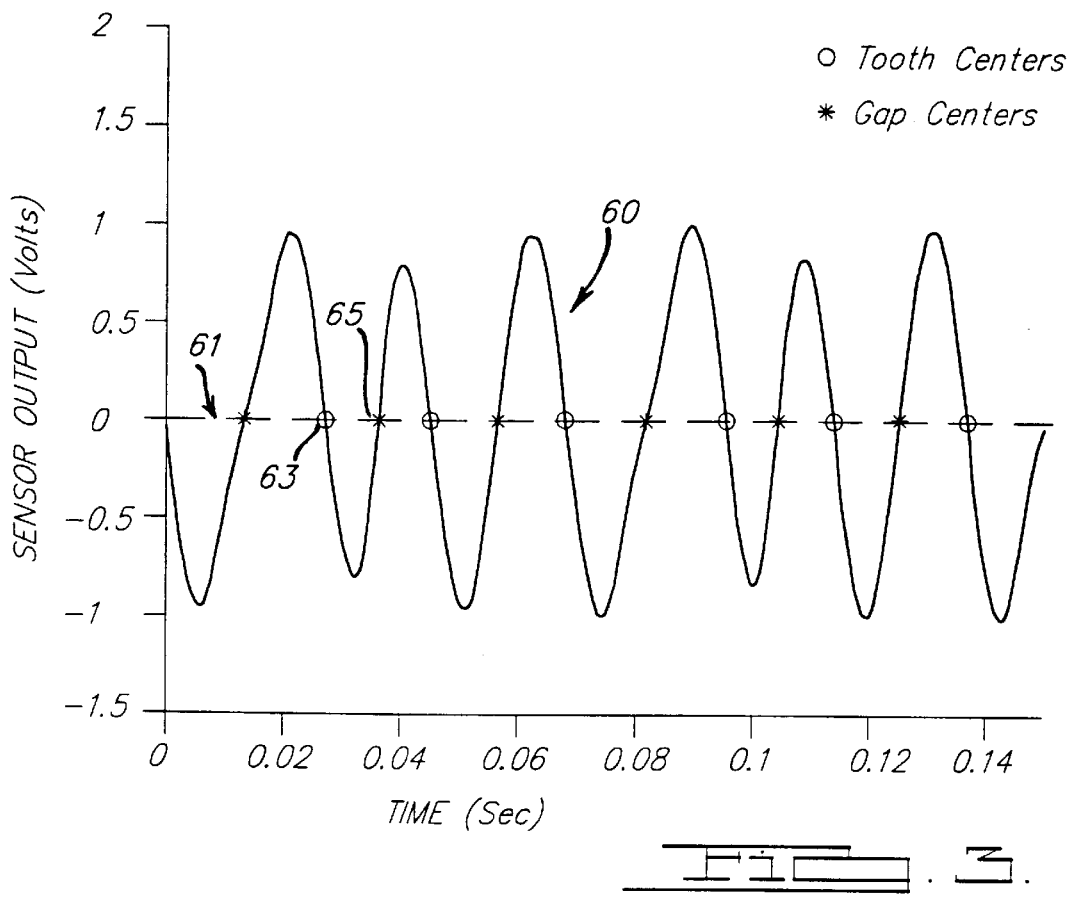
FIG. 3 is a representation of the raw wave form produced by the rotor of FIG. 2 as generated by a sensor according to a preferred embodiment of the present invention.

As shown in FIG. 1, a sensor 50 is provided adjacent the rotor 14. The sensor 50 detects the passing of the teeth 20, 30, 40 during rotation of the rotor 14. In a preferred embodiment, the sensor 50 comprises a Variable Reluctance (VR) sensor. The VR sensor generates a signal which varies based on the proximity of the teeth 20, 30, 40 and gaps 62, 64, 66 provided on the rotor 14. The VR sensor includes a magnet adjacent a coil, and when the profile of the rotor 14 passes by the sensor 50, as shown in FIG. 3, a characteristic signal 60 is developed for the rotor 14 shown in FIG. 2 including a sinusoidal wave form. FIG. 3 represents a 24-tooth wheel with a pattern of teeth spaced at 12, 15 and 18 degrees; the wheel rotates at constant speed.

As the VR sensor 50 detects a change in distance between the sensor and one of the teeth, the sensor 50 outputs a voltage proportional to the rate of change of flux due to the magnetic reluctance of the rotor 14 immediately adjacent the sensor 50, such as a tooth (positive voltage, increasing with tooth/sensor 50 overlap) or a gap (negative voltage with amplitude increasing as tooth/sensor 50 overlap decreases). As the sensor 50 detects the center of a tooth or gap, the signal 60 crosses the y-axis at zero 61 value for the voltage (i.e., zero rate of change of flux). The peaks of the signal 60 represent the edges of the respective tooth or gap.

When using a VR sensor 50, it is preferred to measure the center of the teeth versus the edges. Measuring the edges would require measuring the voltage and processing it to determine the times at which the peaks occurred. In a typical application, the peak voltages can vary from a few tenths of a volt to 100 volts and the frequency can vary from 10 Hz to several thousand Hz. A zero crossing detector can work with a small input voltage range, for example, plus 2.5 volts to minus 2.5 volts, with this signal clipped to the limits when the input is outside this range. Peak detection is a more complicated, less reliable, and more expensive proposition than zero crossing detection. It is therefore preferred to measure the center of the teeth or gaps, 62, 64, 66, as illustrated in FIG. 3, by establishing the zero voltage values as described above. Thus, the VR sensor 50 differs from the Hall Effect type of sensor of the prior art, which detects the magnitude of the flux and not the change in flux. The prior art Hall Effect sensor detects the edges of the teeth 20, 30, 40 and not the center of the teeth 20, 30, 40 (or center of gaps, 62, 64, 66) as presently described.

Figure 4:
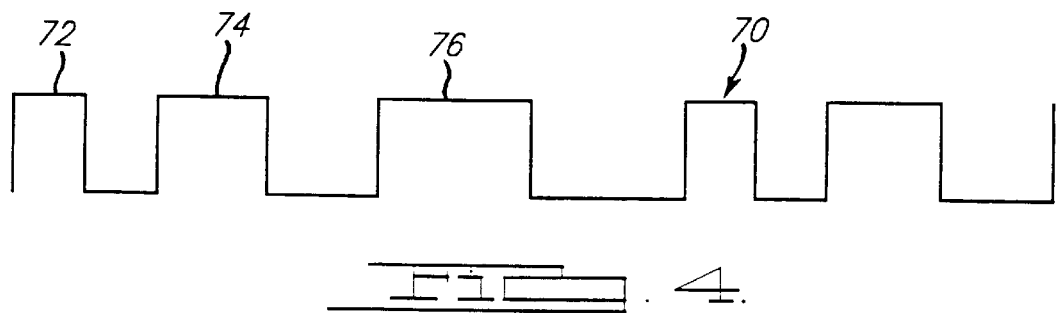
FIG. 4 is a processed form of the wave of FIG. 3, according to the present invention.

The signal 60 generated by the VR sensor 50 is processed to form the wave form 70 as illustrated in FIG. 4. The width of the processed wave form 70 is proportional to the center width 22, 32, 42 of the tooth detected. Thus, for example, if the rotor 14 rotates in a counterclockwise direction, as shown in FIG. 2, the pattern illustrated in the wave form 70 includes a narrow portion 72 of the wave form as the third tooth 40 passes by the sensor 50, a medium width portion 74 as the second tooth 30 passes, and a wide portion 76 as the first tooth 20 passes by the sensor 50. Alternatively, if the shaft 12 rotates in a clockwise direction, the wave form would have a wide wave, followed by a medium width wave, then a narrow wave. Thus, by sensing the centers of only three teeth 20, 30, 40, the direction of rotation may be established by a computer 55.

If only two teeth were provided in a repeated pattern, then the computer 55 would not be able to determine in which direction the shaft 12 rotated by measuring only two teeth, as the pattern would be narrow/wide/narrow/wide in either direction. An example of a rotor meeting this description is illustrated in FIG. 1 of the '460 patent. In order for the present invention to work with such a rotor, the center distance of the teeth and the center distance of the gaps must be measured to establish a useful pattern.

In a preferred embodiment, the sensor 50 comprises a VR sensor. Variable Reluctance Sensors are commercially available from American Electronic Components, Inc., 1010 North Main Street, Elkhart, Ind. Unlike the Hall Effect sensor used in the '332 patent, a VR sensor 50 requires only two leads and does not require a power input. Thus, the complexity of the sensor 50 is minimized and the reliability is therefore improved.

As shown in FIG. 3, the voltage generated by the VR sensor 50 crosses the zero axis 61 at the center of the tooth on a falling slope 63, and crosses the zero axis 61 at the center of the gap between the teeth 65. The time between the zero voltage input for the falling voltage is monitored by a computer 55, such as a powertrain control module (PCM) in the case of a transmission, to establish the relative time between tooth centers, and therefore the computer 55 is able to determine the relative width of the tooth and/or the gap.

It has been determined, in a preferred embodiment, that the zero voltage of the tooth 63 is more reliable of a measurement than the zero voltage of the gap 65, and, therefore, in such a preferred embodiment, the zero voltage of the tooth 63 is used, which is depicted as a falling edge of the wave form 60 as illustrated in FIG. 3. However, the voltage of the gap 65 could be used in an alternative embodiment, as described above. When the computer 55 detects a zero voltage, the computer assigns a time to a register, as described below. The computer 55 then measures the time at which the next zero voltage is detected.

In a preferred embodiment, once the direction of rotation is determined, as described above, at higher speeds, not every tooth is measured. Thus, for example, above 1000 RPM, every third tooth is measured since every third tooth is equally spaced. Thus, any acceleration or deceleration is easily detected by comparing the time for the prior third tooth to pass the sensor 50 to the time for the current third tooth to pass the sensor 50.

In a preferred embodiment, the computer 55 stores the four most recent times at which a tooth center was detected. In a preferred embodiment, when the rotor 14 rotates at constant speed in one direction, any set of four consecutive tooth center times are used to determine the direction of rotation. The times at which the tooth centers pass the sensor 50 are stored in the computer 55 as $T_0$, $T_1$, $T_2$, and $T_3$. $T_0$ is the most recently measured time and $T_3$ is the least recently measured time. The computer 55 subtracts each of the times to establish a delta time (e.g., the elapsed time between teeth 20 and 30 or 30 and 40 or 40 and 20). The delta times $T_0-T_1$, $T_1-T_2$, and $T_2-T_3$ are classified as short(S), medium(M), or long(L) by comparing the individual delta times to the average delta time.

A first direction is determined when a pattern of teeth is detected, where the computer 55 establishes $T_0-T_1$ is S, $T_1-T_2$ is M, and $T_2-T_3$ is L; or when $T_0-T_1$ is M, $T_1-T_2$ is L, and $T_2-T_3$ is S; or when $T_0-T_1$ is L, $T_1-T_2$ is S, and $T_2-T_3$ is M. The opposite direction is indicated when $T_0-T_1$ is S, $T_1-T_2$ is L, and $T_2-T_3$ is M, or when $T_0-T_1$ is M, $T_1-T_2$ is S, and $T_2-T_3$ is L, or when $T_0-T_1$ is L, $T_1-T_2$ is M, and $T_2-T_3$ is S.

When the shaft 12 is changing speed, the average and individual delta times change in inverse proportion to the speed. At lower speeds and higher rates of change, it is possible to get an incorrect or inconclusive classification of the delta times as small, medium, or large due to acceleration. The preferred embodiment addresses this by implicitly correcting for acceleration and by using a robust classification method as described below.

A preferred embodiment utilizes a queue of six consecutive tooth center times (the time of the falling transition of the signal in FIG. 4) to generate the data for the classification and inference algorithm at low speeds (preferably below 1000 RPM). In such an embodiment, $T_0$, $T_1$, $T_2$, $T_3$, $T_4$, and $T_5$ comprise the time at which the tooth centers pass by the sensor 50, with $T_0$ being the most recent time. The computer 55 computes three ratios: $R_1=(T_1-T_2)/(T_0-T_3)$, $R_2=(T_2-T_3)/(T_1-T_4)$, and $R_3=(T_3-T_4)/(T_2-T_5)$. The computer 55 thus compares each individual delta time with the sum of three delta times including: the present delta time, the previous delta time, and the following delta time. This provides an implicit (and approximate) correction for constant shaft 12 acceleration.

Figure 5:
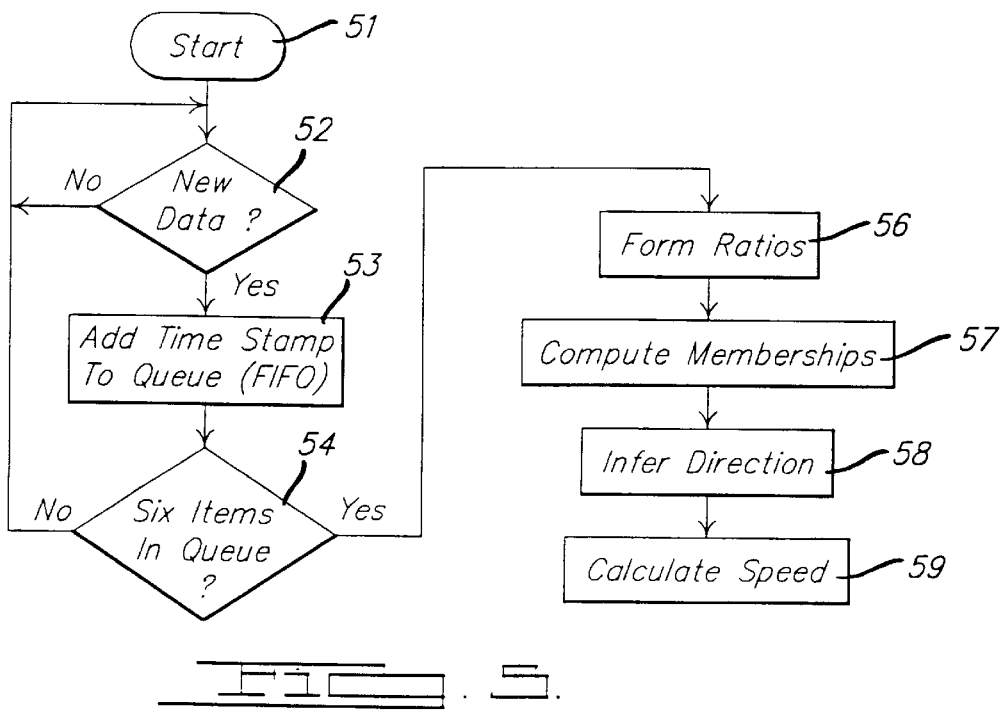
FIG. 5 is a flow chart for determining the direction of rotation according to a preferred embodiment of the present invention.

As illustrated in the flow chart of FIG. 5, the process is started 51, at which time new data is collected 52. Each datum has a time stamp and is stored in queue as $T_i$ as described above. Preferably, calculations are performed at low speed with six data in queue 54. The ratios $R_i$ are formed 56 as described above, then the membership values are calculated 57 and the direction is inferred 57 therefrom. Finally, the rotational speed is calculated 57. In an alternative embodiment, $T_0-T_3$, $T_1-T_4$, and $T_2-T_5$ are utilized to make estimates of the acceleration and produce a more sophisticated correction for acceleration. In such an embodiment, the order of the gaps is classified by making use of explicit estimates of the acceleration.

The present invention further includes a means of protecting the rotating shaft 12 from reversing direction at high rotational speeds such as in a transmission. As described above, it is preferred to use a queue of six consecutive tooth center times to generate the data for the classification and inference algorithm. But, as speed increases, the time for consecutive tooth centers to pass the sensor 50 decreases, and the fractional speed change over three delta times is negligible. In a preferred embodiment, at higher speeds, particularly above 1000 RPM, the direction of rotation is determined using four tooth times instead of six, with the ratios being $(T_0-T_1)/(T_0-T_3)$, $(T_1-T_2)/(T_0-T_3)$, and $(T_2-T_3)/(T_0-T_3)$.

Thus, if, for example, the computer 55 is reset while the vehicle is traveling down the road with the output shaft 12 speed above 1000 rpm, the system may not be able to obtain six consecutive tooth center times, but is able to measure four consecutive tooth center times. Thus, the direction of rotation of the output shaft is determined and known when the vehicle is restarted while in neutral and moving at high speed, thereby protecting the transmission. For example, the transmission will not be permitted to be shifted from neutral into reverse while the vehicle is traveling forward above a predetermined speed. The computer 55 will thus not enable the driver to select a gear in the transmission which would reverse the direction of rotation of the rotor 14 until the shaft 12 speed approaches zero.

The present invention further provides a filter to isolate vibration induced noise. The Variable Reluctance sensor 50 essentially measures changes in the air gap between the sensor 50 and the rotor 14. While the rotor 14 is not spinning, the rotor 14 may be subject to linear or rotational vibrations relative to the sensor 50. These vibrations may vary the gap and therefore produce a voltage from the sensor 50. If the source of vibrations is periodic, then using the standard prior art system with evenly spaced targets, the signal will be interpreted by the computer 55 as the shaft 12 is spinning at a constant speed proportional to the vibration. Without filtering, an engine induced vibration will thus result in a noise which produces a signal proportional to the engine RPMs. We have discovered that the vibration will normally not produce the short period, medium period, long period pattern as described above. A preferred embodiment, therefore, will filter the signal at low RPMs and discard any data which does not produce a long/medium/short or short/medium/long pattern.

In a preferred embodiment, fuzzy logic is used to implement a robust direction detection algorithm. Fuzzy logic techniques are well known to one skilled in the art and are therefore not described in great detail. An example is *Fuzzy Sets and Fuzzy Logic: Theory and Applications,* by George J. Klir and Bo Yuan (Prentice Hall PTR, Upper Saddle River, N.J. 07458. ISBN=0-13-101171-5), which is incorporated herein by reference.

Accordingly, for each ratio $R_i$ (for i=1,2,3), three membership values are computed $A_i$, $B_i$, and $C_i$. $A_i$ can be loosely interpreted as the strength of the statement "$R_i$ is small"; $B_i$ as the strength of "$R_i$ is medium"; and $C_i$ as the strength of "$R_i$ is large". The strength of the statement "the shaft 12 is turning in direction 1" is computed using fuzzy logic rules to evaluate the statement "{ ($R_i$ is small) and ($R_2$ is medium) and ($R_3$ is large) } or { ($R_1$ is medium) and ($R_2$ is large) and ($R_3$ is small) } or { ($R_1$ is large) and ($R_2$ is small) and ($R_3$ is medium) }". The strength of the statement "the shaft 12 is turning in direction 2" is computed using fuzzy logic rules to evaluate the statement "{ ($R_1$ is small) and ($R_2$ is large) and ($R_3$ is medium) } or { ($R_1$ is medium) and ($R_2$ is small) and ($R_3$ is large) } or { ($R_1$ is large) and ($R_2$ is medium) and ($R_3$ is small) }". The strength of the two direction statements can be compared to determine which direction the shaft 12 is turning. If both direction statements are weak, then either the speed is determined to be zero or the direction is assumed to be unchanged from the last known direction. An example of one possible implementation is illustrated as follows, and as illustrated in FIG. 6:

$$D_1 = A_1{}^*B_2{}^*C_3 + B_1{}^*C_2{}^*A_3 + C_1{}^*A_2{}^*B_3, \text{ and}$$
$$D_2 = A_1{}^*C_2{}^*B_3 + B_1{}^*A_2{}^*C_3 + C_1{}^*B_2{}^*A_3,$$

where each $A_i$, $B_i$, $C_i$, and $D_i$ is between 0 and 1, with 1 being very strong and 0 being very weak. The direction of rotation is determined by the difference D1–D2. The magnitude of the difference of $D_1$–$D_2$ establishes the confidence in the direction of rotation. FIG. 6 shows a possible mapping from $R_i$ to $A_i$, $B_i$, and $C_i$ for a 24 tooth rotor 14 with a 12, 15, 18 degree spacing pattern. As shown in FIG. 6, the sum of $A_i$, $B_i$, $C_i$ at any ratio R is unity. The above use of fuzzy logic method provides a level of confidence for the direction of rotation.

Another feature of the present invention includes an error detection which determines if a sensor 50 is wired backwards. In such an instance, the sensor 50 voltage as shown in FIG. 3 will have its polarity reversed. The positive peaks will become negative peaks and vice versa. Then, the falling transitions in FIG. 4 will correspond to the gap centers instead of the tooth centers. This condition can be detected using the fact that the large and small gap center widths have different sizes than the large and small tooth center widths, respectively. In the example given previously, the tooth centers are separated by 12, 15, and 18 degrees and the gap centers are separated by 13.5, 15, and 16.5 degrees. This condition could also be detected by comparing the inferred direction with an otherwise validated direction (inferred by the computer, or powertrain control module (PCM), using other inputs, or from an external test system on an assembly line). The computer 55 may then reject the signal from the sensor 50 and output an error signal to the driver, or permanently flip the signal output by the sensor 50 to the proper value, or switch from using the falling transitions in FIG. 4 to using the rising transitions in FIG. 4 once it determines the sensor 50 is wired improperly.

It is to be understood that the embodiments of the invention described above are merely illustrative of application of the principles of the present invention. Numerous modifications may be made to the methods and apparatus described above without departing from the true spirit and scope of the invention.

What is claimed is:

1. An apparatus for determining the speed and direction of a rotating shaft, comprising:

a rotor connected to the shaft, the rotor having three circumferentially spaced teeth, the center of the first tooth having a first spacing, the center of the second of said teeth having a second spacing different than the first spacing, and the center of the third of said teeth having a third spacing different than the second and first spacings;

a sensor for detecting the center of each of said teeth and producing a signal in response thereto; and a computer for receiving said signal and determining the speed and direction of rotation of the shaft rotating in a first direction by determining a first time period to reach the center of the first tooth, a second time period to reach the center of the second tooth and a third time period to reach the center of the third tooth.

2. An apparatus according to claim 1 wherein the second tooth is provided between the first and third teeth, and a first direction of rotation is determined when the first time period is greater than the second time period, and a second direction of rotation is determined when the first time period is less than the second time period.

3. An apparatus according to claim 2, wherein each of the three teeth has a width substantially the same as the width of the other two teeth, a gap having a width is provided between each of said teeth, and the center distance is varied by varying the width of the gap between the teeth.

4. An apparatus according to claim 2, wherein the sensor comprises a VR sensor and the apparatus further comprises a filter for eliminating signals from vibrationally induced noise.

5. An apparatus according to claim 4, wherein the filter comprises having the computer ignore the signals if the relative time periods do not follow a pattern from one of the group consisting of long/medium/short and short/medium/long.

6. An apparatus as set forth in claim 2, wherein a second set of three similarly spaced teeth are circumferentially spaced adjacent the first set of three teeth to form a repeating pattern with the teeth arranged in sets of teeth having progressively increasing tooth center spacing and the speed and direction of rotation of the shaft is determined by further determining a seventh time period to reach the center of the fourth tooth, an eighth time period to reach the center of the fifth tooth and a ninth time period to reach the center of the sixth tooth.

7. An apparatus according to claim 6 wherein the speed of the shaft is determined by measuring the time to reach every third tooth.

8. An apparatus according to claim 7, wherein acceleration is determined by comparing the time to reach the most recent third tooth to the time to reach the prior third tooth.

9. An apparatus according to claim 7, wherein a ratio is calculated by dividing (the difference of the two time periods measured just prior to the time period measured most recently) by (the difference of the time period measured most recently and the time period measured three periods prior to the most recently measured time period).

10. An apparatus according to claim 9, wherein fuzzy logic is used to determine the direction of rotation, comprising six time periods being measured, three ratios being calculated, and three sets of membership values being established to determine the direction of rotation.

11. An apparatus according to claim 10, wherein four time periods are measured, three ratios are calculated, and three sets of membership values are established to determine the direction of rotation during high speeds of rotation.

12. An apparatus according to claim 11, wherein the apparatus further comprises means for preventing reversal of the rotor unless the rotational speed is below a predetermined value.

13. An apparatus according to claim 10, wherein a confidence level in the direction of rotation is established using the membership values.

14. An apparatus according to claim 10, wherein the sensor has a pair of electrical connections and the apparatus further comprises a means for detecting if the electrical connections are reversed.

15. A sensor according to claim 14, wherein the sensor comprises a variable reluctance sensor.

16. An apparatus for determining the speed and direction of a rotating shaft, comprising;
   a rotor connected to the shaft having a plurality of circumferentially spaced teeth and three gaps provided therebetween, the first of said gaps having a first center distance, the second of said gaps having a second center distance greater than the center distance of the first gap, and the third of said gaps having a third center distance greater than the center distance of the second gap;
   a sensor for detecting the center of each of said gaps and producing a signal in response thereto; and
   a computer for receiving said signal and determining the speed and direction of rotation of the shaft rotating in a first direction by determining a first time period to reach the center of the first gap, a second time period to reach the center of the second gap and a third time period to reach the center of the third gap.

17. An apparatus according to claim 16, wherein a ratio is calculated by dividing of the difference of two time periods measured just prior to the time period measured most recently by the difference of the time period measured most recently and the time period measured three periods prior to the most recently measured time period.

18. An apparatus according to claim 17, wherein fuzzy logic is used to determine the direction of rotation, comprising six time periods being measured, three ratios being calculated, and three sets of membership values being established to determine the direction of rotation.

19. An apparatus according to claim 18, wherein a confidence level in the direction of rotation is established using the membership values.

20. An apparatus for determining the speed and direction of a rotating shaft, comprising:
   a rotor connected to the shaft, the rotor having a plurality of pairs of three circumferentially spaced teeth, the center of the first tooth having a first spacing, the center of the second of said teeth having a second spacing greater than the first spacing, and the center of the third of said teeth having a third spacing greater than the second spacing;
   a VR sensor for detecting the center of each of said teeth and producing a signal in response thereto; and
   a computer for receiving said signal and using fuzzy logic to determine the speed and direction of rotation of the shaft rotating in a first direction by determining a time period to reach the center of six of the teeth, and three ratios are calculated by dividing (the difference of the two time periods measured just prior to the time period measured most recently) by (the difference of the time period measured most recently and the time period measured three periods prior to the most recently measured time period), and three sets of membership values are established to determine the direction of rotation and to establish confidence level in the direction of rotation.

* * * * *